May 25, 1965   F. A. HOWARD   3,185,785
COMBINED INFLATION VALVE AND CIRCUIT-CLOSING
MECHANISM FOR PNEUMATIC TIRES
Filed April 13, 1961   3 Sheets-Sheet 1
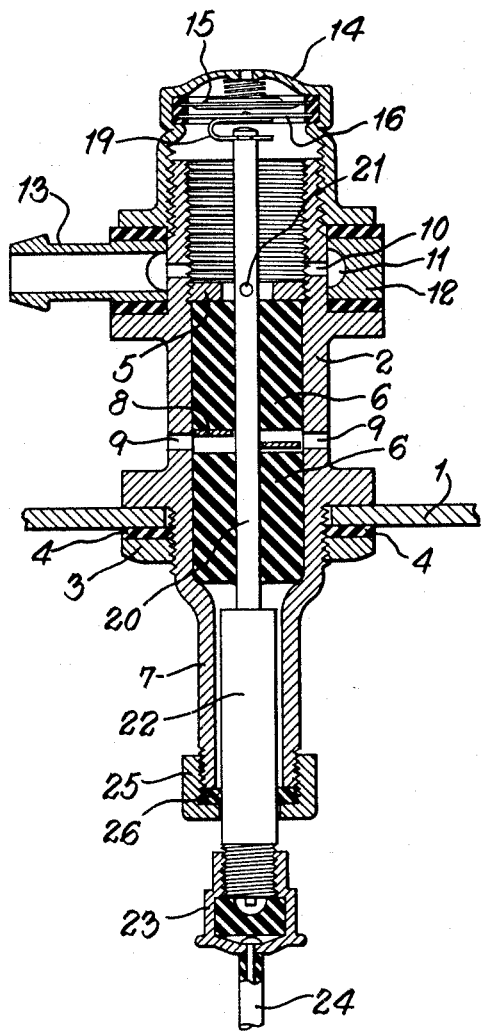
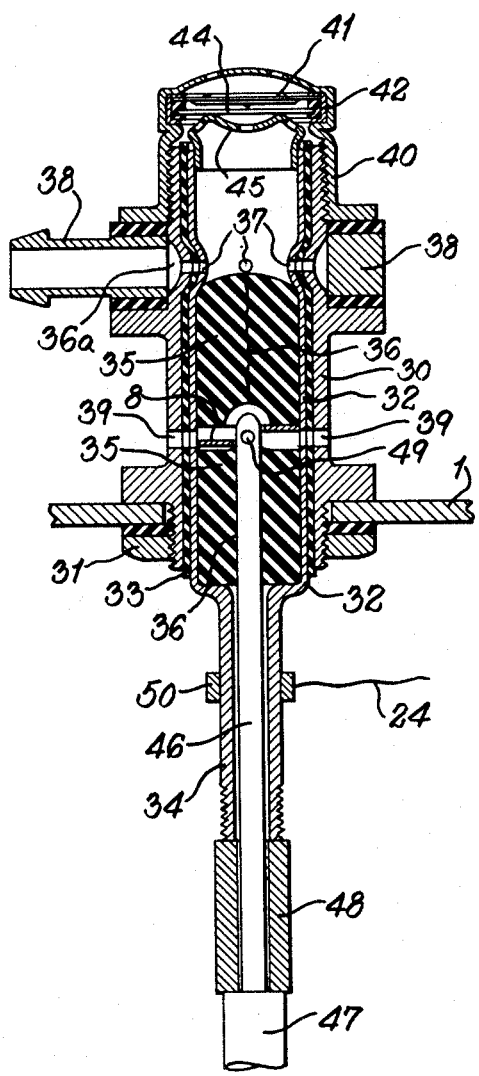
INVENTOR.
FRANK A. HOWARD
BY
Kenyon & Kenyon
ATTORNEYS May 25, 1965         F. A. HOWARD         3,185,785
COMBINED INFLATION VALVE AND CIRCUIT-CLOSING
MECHANISM FOR PNEUMATIC TIRES
Filed April 13, 1961         3 Sheets-Sheet 2

*INVENTOR.*
FRANK A. HOWARD
BY
*ATTORNEYS*

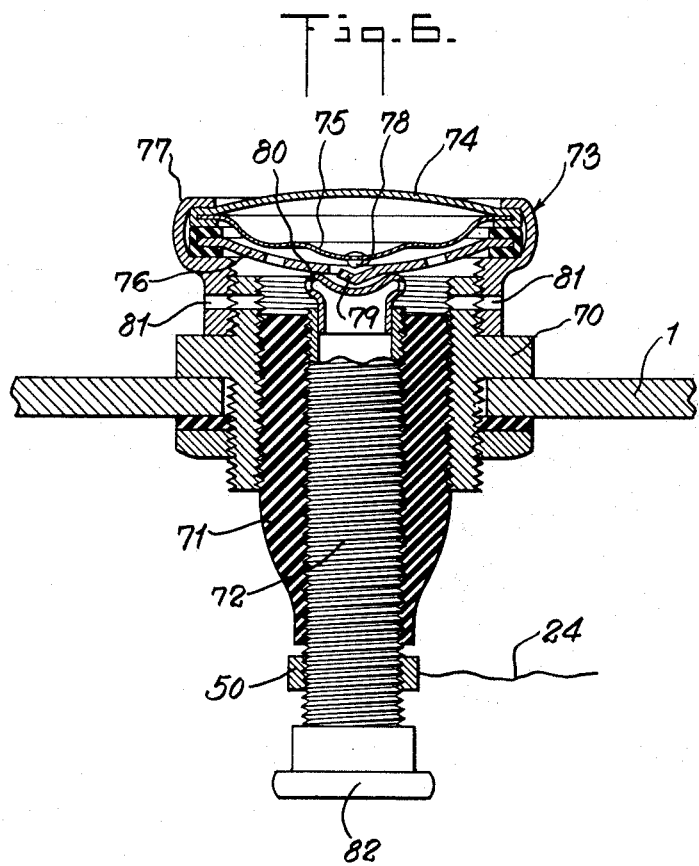

United States Patent Office 3,185,785
Patented May 25, 1965

3,185,785
COMBINED INFLATION VALVE AND CIRCUIT-CLOSING MECHANISM FOR PNEUMATIC TIRES
Frank A. Howard, New York, N.Y.; Irma Amelie Howard, Frank A. Howard, Jr., and The Chase Manhattan Bank, executors of said Frank A. Howard, deceased
Filed Apr. 13, 1961, Ser. No. 102,726
8 Claims. (Cl. 200—61.25)

My invention relates to improvements in pneumatic vehicle tires and more especially to tire valve construction.

In my co-pending application Serial No. 585,223, filed May 16, 1956 which has become Patent No. 2,969,824, I have shown and described a dual-valve safety pneumatic tire combined with a circuit-closing element located in the outer valve cap and operative in the event of failure of a tubeless tire equipped with an inner safety ring which forms an emergency tire, and also a tire deflation alarm circuit for use therewith applicable to a motor vehicle. In my co-pending application Serial No. 42,626 filed July 13, 1960, which has become Patent No. 3,065,763, I have shown and described improved elastomer plug dual valve designs applicable to safety tires of the type above referred to. In the present application I have shown and described examples of pneumatic tire valves combined with novel circuit-closing elements suited for use with the type of deflation alarm circuits shown in my co-pending application referred to.

My present invention will be fully understood from the following specifications taken in connection with the accompanying drawings.

In these drawings FIGURE 1 is a cross section of a dual valve of the general type shown in my co-pending application No. 42,626, equipped with an improved circuit-closing element which operates in the event the air pressure in the outer tire compartment of a dual tire such as is shown in my application No. 585,223 falls too far below the pressure in the inner tire compartment.

FIGURE 2 is a cross section of an alternative dual valve construction of a simplified type.

Figure 5:
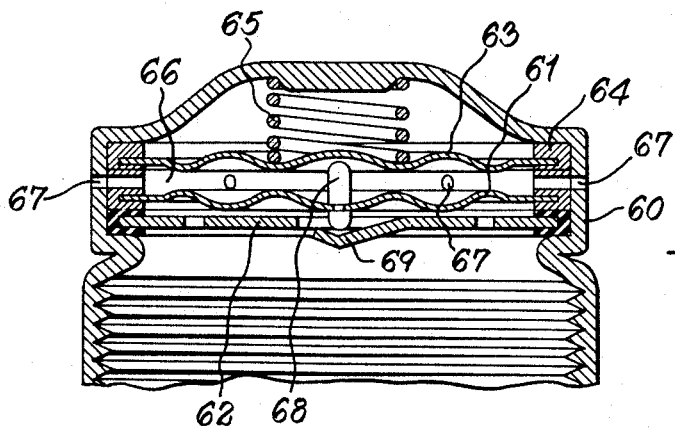

FIGURE 5 is an enlarged cross section of a circuit-closing element which can be substituted for that of FIGURE 2 to close the deflation alarm circuit when the outer tire compartment pressure falls below that in the inner compartment and also when the inner tire compartment itself loses pressure, and FIGURE 6 is a cross section of a modified design of standard tire inflation valve carrying a single circuit-closing element useful for closing the alarm circuit when the pressure falls in a standard tubeless tire.

Referring first to FIGURE 1, the numeral 1 indicates the metallic rim of the vehicle wheel on which the tire is mounted. This rim is normally grounded to the metallic frame of the vehicle through a metallic wheel, hub, axle and springs, so that it may be treated as the ground of a tire deflation alarm circuit, all as described in my co-pending application No. 585,223. The metallic rim 1 has a valve hole in which the metallic valve body 2 is mounted and to which it is grounded, the securing nut 3 threaded onto its outside portion thus locking it in position. A rubber gasket 4 seals the valve body hermetically to the rim when the nut 3 is run up tight against the rim.

Figure 3:
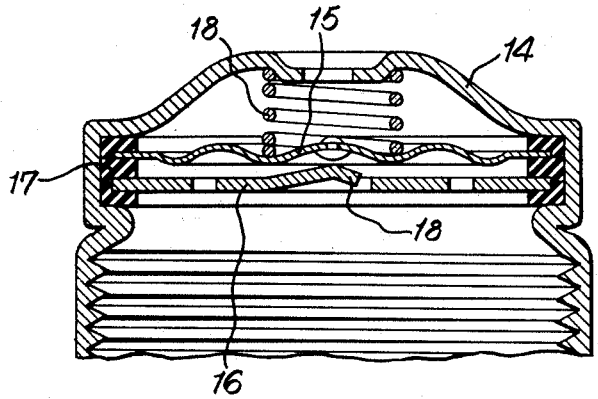
FIGURE 3 is an enlarged cross section of the inner valve cap carrying the circuit-closing mechanism of FIGURE 2.

The valve body 2 has a cylindrical bore extending from the open inner end to a reduced external end which serves as the lower abutment for the elastomer sealing plugs 6. As described in my co-pending application No. 42,626 these two plugs are initially of a diameter somewhat larger than the bore of the valve body and are forced into the bore and held there by a ring nut 5 threaded into the open upper end of the body. The two plugs are held apart by a warped or radially corrugated washer 8, also as shown in my co-pending application referred to, and the valve body 2 is perforated at this point as shown at 9 so that air communication is provided through the valve wall. Beyond the ring nut 5 the valve body also has perforations 10 which open into a groove 11 in a ring fitting 12 which carries the nipple 13 for attaching the hose connection to the outer tire compartment of a dual tire such as that described in my prior patent No. 2,969,824. The ring 12 is sealed against the valve body by an inner valve cap 14 threaded onto the inner end of the valve body. The inner valve cap 14 carries the pressure-sensitive movable circuit-closing element of the valve. As is more clearly shown in FIGURE 3, this element takes the form of a thin metal disk or diaphragm 15 which may have concentric corrugations or ribs to increase its flexure under unbalanced gas pressures. For convenience of calibration and also to limit motion of the flexible diaphragm, the cap 14 carries not only the diaphragm 15 but also an underlying perforated insulated metallic contact disk 16, the two being mounted in the cap between and separated by three insulating, sealing, and spacing washers 17. To insure electrical contact between the diaphragm or disk 15 and the cap 14, and also to apply a load to the disk 15 if desired, there may be inserted a helical spring 18' between the top of the cap and the disk 15. Both the top of the cap 14 and the disk 16 are perforated as shown to expose the top face of the disk 15 to the pressure in the space above the cap, which is the inner tire compartment of the dual tire, and to expose the bottom face of the disk 15 to the pressure of the outer tire compartment, communicated to this inner face through the valve body by the nipple 13 and the perforations 10 into the chamber within the valve body at this point.

In my prior application No. 585,223 I have shown and described the manner in which an external valve cap carrying a pressure-sensitive circuit-closing device in the form of a disk overlying a second disk with which it makes contact when the pressure difference on its two faces reaches the predetermined point, is calibrated by deforming the contact point of the underlying disk while the predetermined pressure is applied to the outer disk. This same calibration procedure may be conveniently employed to the cap 14 by manually deforming a tongue 18 on the disk 16 to the extent necessary to insure contact at this point with the center of outer disk 15 when the pressure on the top surface of disk 15 exceeds the pressure on its lower surface by the predetermined margin, for example 5 lbs. per in.$^2$. The underlying disk 16 also serves the purpose of preventing excessive distortion of the flexible diaphragm 15 in the event the pressure on its upper surface exceeds that of its lower surface by an amount greater than that at which the tongue 18 is first contacted by the center of the diaphragm 15.

Before the previously calibrated cap 14 is mounted on the inner end of the valve body 2, a small U-shaped spring 19 having a forked lower element is forced over a ring groove near the end of the hollow needle 20 which is used to introduce the air selectively into the inner or outer tire compartments as described in my prior application No. 42,626. When put in place the U-spring 19 serves the additional purpose of limiting the outward axial motion of the hollow needle 20 so that the air delivery hole 21 thereof will register with the warped spacer washer 8 to deliver air into or out of the inner tire compartment through the air holes 9. Inward axial adjustment of hollow needle 20 is limited by contact between the ring nut 5 and the spring 19 on the end of the needle. The inflation check-valve barrel 22 forms the hollow handle for the needle 20. This barrel 22 carries a standard tire inflation check valve and is threaded on its outer end to receive an outer valve cap 23 to which there is secured the live wire 24 of the tire deflation alarm circuit. This circuit may be connected to the vehicle electrical system in the manner shown in my prior application No. 585,223. The inflation check valve barrel 22 is of smaller diameter than the bore of the valve body 2 in which it slides, so it does not make electrical contact therewith. It may be locked in the inner or outer axial position by a gland nut 25 which forces an insulating packing ring 26 inward to seal and lock the barrel 22 as described in my prior application 42,626.

When the valve shown in FIGURE 1 has been completely assembled, and mounted in the rim on which a dual tire of the form illustrated in my prior application No. 585,223 is mounted, the rim 1 will be electrically grounded to the vehicle frame and the live wire 24 will connect with a source of power and an alarm device on the vehicle. Under these conditions the flexible diaphragm or disk 15 will be normally in the position shown in FIGURES 1 and 3, but if the pressure within the inner tire compartment, to which pressure the outer face of the disk 15 is exposed, exceeds the pressure in the outer tire compartment by a predetermined amount, for example 5 lbs. per in.$^2$, the disk 15 will be forced inward until it contacts the tongue 18 of the underlying disk 16. This disk is in contact through the U-spring 19, with the air-needle 20, which is insulated from the valve body and the rim but connected to the live wire 24 of the deflation alarm circuit. This deflation alarm circuit is, therefore, closed by grounding the live wire through the automatic operation of the circuit-closing element enclosed within the inner cap 14.

In FIGURE 2 I have shown a simplified valve construction. In this simplified design the body of the valve, designated 30, is shown as mounted in the valve opening in the rim 1, as before. The valve body is locked in position and its inner bearing flange grounded to the rim by an outer ring nut 31. A thin inner cylinder 32 is insulated from the valve body 30 by a coating or layer of insulation designated 33. The inner cylinder 32 carries on its outer end a nipple 34 of the same form as a standard inflation check valve barrel and threaded externally in the usual way so as to be able to receive a standard tire inflation valve cap. Within its main bore the cylinder 32 carries two self-closing valves in the form of elastomer plugs 35 axially aligned, each plug having a central cut or fissure designated 36. The elastomer plugs 35 are of a normal diameter exceeding that of the bore of the inner cylinder 32 so they must be compressed elastically to be inserted within the cylinder. They are spaced apart by a warped or corrugated washer 8. The elastomer plugs 35 are inserted within the cylinder 32 under compression, both radially and axially, after the cylinder 32 has been positioned as shown in the valve body 30. When the parts have been assembled in this manner, and while the elastomer plugs 35 are still being held under axial compression, the outer wall of the valve body is crimped or rolled inwardly as indicated at 36a to reduce the diameter of the valve body 30 and the inner cylinder 32 and thus retain the elastomer plugs in their assembled position as shown in FIGURE 2. Air holes 37 through the inner and outer cylinders 32–30 communicate with the groove formed by the crimping operation just described, and thus provide air communication with a flat ring fitting carrying a nipple 38 designed for attachment of a flexible air connection for delivery of air to an outer tire compartment as previously described. Air holes 39 likewise passing both through the valve body 30 and through the inner cylinder 32 are located at the zone between the two elastomer plugs so as to pass air freely into and out of this zone from the inner tire compartment surrounding the valve.

The inner valve cap in FIGURE 2 is designated 40 and as in the case of the design shown in FIGURE 1 it is threaded on to the open end of the valve body where it serves to lock and seal the fitting 38 which carries the flexible air attachment. The internal construction of the valve cap 40 is somewhat modified. The margin of the flexible diaphragm designated 41 is crimped in a metal ring 42 which it contacts on the upper surface. The crimped ring 42 also carries between two insulating washers 42a the insulated contact disk 44. The ring 42 is assembled in the nut 40 and the diaphragm calibrated by deforming the central portion of the contact disk 44 so that the center of the pressure-sensitive diaphragm 41 will contact with it when the pressure on the upper face of the diaphragm 41 exceeds the pressure on the lower face by a predetermined amount, for example 5 lbs. per in.$^2$. Electrical contact between the inner valve cylinder 32 and contact disk 44 is provided by a thin metal skeleton cap or spider 45 which exerts a pressure against the lower face of the disk so light as not to affect the calibration. In FIGURE 2 I have shown a hollow air inflation needle 46 carried on the end of an inflation check valve barrel 47 which serves as a handle for the needle, which is inserted through the reduced neck portion 34 of the inner cylinder 32. A removable sleeve 48 slipped over the hollow needle 46 limits the inward axial motion of the needle so that the interruption in its wall forming the air delivery hole 49 registers with the space between the elastomer plugs 35.

It will be understood that the hollow needle 46 may be forced into and through the fissure 36 of the lower elastomer plug 35 to arrive at the position shown, and in this position air may flow into or from a tire compartment surrounding the valve body 30 through the holes 39. In this position of the parts the fissure 36 in the upper elastomer plug 35 is held closed by the compression of the plug within the bore of the cylinder 32, and escape of air around the hollow needle 46 is prevented by the contact of the compressed wall of the fissure against the surface of the needle.

Using the inflation valve barrel 47 as a handle, the needle may be withdrawn from the position shown in FIGURE 2, the sleeve 48 removed therefrom and the needle reinserted, this time passing through the inner elastomer plug 35 as well, so that the air delivery hole 49 will now lie in the upper end of the inner cylinder 32 from whence it may deliver air through the holes 37 and fitting 38 into a hose attachment, not shown, connecting with an outer tire compartment, such as is shown in my prior application No. 585,223.

In the preferred use of the dual valve construction shown in FIGURE 2 the needle 46 is withdrawn completely from the valve body when the inflation has been completed and a standard valve cap is threaded onto the threaded end 34 of the inner valve body so to form a second seal to prevent any possible leakage of air from the interior of the tire. Since the pressure difference between inner and outer tire compartments of a dual tire of the general type shown in my prior application No. 585,223 is normally very small, the danger of seepage of air from one tire compartment to the other through the fissure 36 of the upper elastomer plug 35 is minimized and the outer elastomer plug 35 which is normally adequate to prevent any outward air leakage at all, is supplemented by the standard valve cap on the end of the valve neck 34.

The operation of the circuit-closing element within the inner valve cap 40 will, it is believed, be obvious from the above description. The live wire 24 is in this case connected to a metal ring 50 clamped around the neck 34. By this means the inner valve cylinder 32 and the contact spring or spider 45 convey the current to the underlying disk 44. The deflation alarm circuit will then be closed by inward deflection of the diaphragm 41 when the pressure on its top face exceeds that on its lower face by the predetermined amount for which it has been previously calibrated.

The design shown in FIGURE 2 is of maximum simplicity since it dispenses with the mechanical air inflation check valve normally used in every tire valve. A single standard inflation check valve with attached air needle, as shown in FIGURE 2, suffices for all the tires on a vehicle equipped with these simplified rim valves.

In FIGURE 5 I have illustrated a valve cap corresponding to the cap 14 of FIGURE 1 and 40 of FIGURE 2 but including both the pressure-sensitive element intended to close a deflation alarm circuit when the pressure difference between inner and outer tire compartments reaches the predetermined limit, and also an element similar to an aneroid barometer combined therewith so that the deflation alarm circuit will be closed whenever the absolute pressure in the inner tire compartment of the dual tire falls to a predetermined point.

In FIGURE 5 the modified form of inner valve cap is designated 60. It includes a pressure-sensitive metal diaphragm 61 overlying an insulated contact disk 62 as before. There is superimposed over these parts an aneroid barometer which is made by the use of a second flexible diaphragm 63 hermetically sealed at 64 in the top of the cap. The diaphragm 63 may be loaded by the internal helical spring 65 to assist in overcoming the resistance to flexure of the diaphragm and insure its outward or downward motion to the extent desired when the absolute pressure in the compartment 66 which lies between the diaphragm 61 and the diaphragm 63 falls to a predetermined point, for example 30 lbs. per in.$^2$ absolute. The space 66 communicates with the surrounding inner tire compartment through the openings 67. In the center of the diaphragm 61 there is mounted a pin 68 which transmit motion from the upper diaphragm 63 to the lower diaphragm 61 when the predetermined minimum absolute pressure is reached in the chamber 66 between the two diaphragms. The pin 68 may be secured in the center of the diaphragm 61 so that it also forms the contact point for making metallic contact with the tongue 69 of the lower contact disk 62.

It is believed the operation of this modified cap with its combination aneroid barometer and pressure differential element, of the form previously described, will be clear from the above description of the parts. It is not necessary that the aneroid barometer element used for this purpose should have any degree of sensitivity comparable with that of an atmospheric barometer. If the diaphragm 63 is sufficiently flexible to distort or flex downward in an amount sufficient to depress the pin 68 and thus close the deflation alarm circuit when the absolute pressure in the chamber 66, which is that of the inner tire compartment, drops about 5 lbs. per in.$^2$ below the pressure at which the tire is designed to operate, the barometer element will be sufficiently sensitive for most practical purposes. Preferably the aneroid barometer element of the present invention, made up of the top of the cap and the flexible diaphragm, with or without the loading spring 65, will be assembled under superatmospheric pressure about equal to the operating pressure of the tire. While this will somewhat increase temperature effects, it will give the maximum assurance of reliable operation as a circuit-closing element for a tire deflation alarm circuit. The underlying insulated disk 62 protects both the flexible diaphragms 61 and 63 against dangerous distortion.

Figure 4:
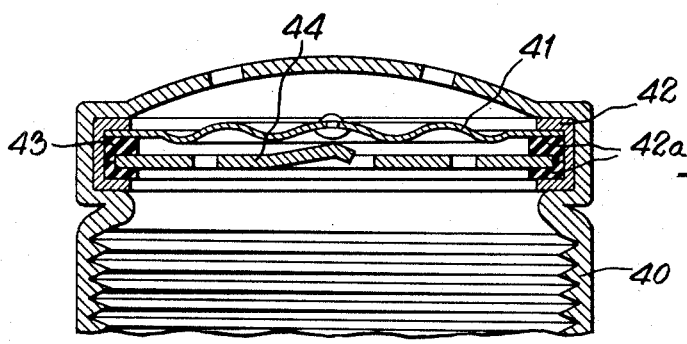
FIGURE 4 is a cross section of a somewhat modified form of inner cap in which the circuit-closing elements are pre-assembled as a unit before being mounted in the cap.

In FIGURE 6 I have shown a valve suitable for general tire use but including some of the special features heretofore described. The valve body in FIGURE 4 is designated 70. It is secured in and electrically grounded to the rim 1 in the same manner previously described. The central bore of the valve body 70 may be threaded or serrated to bond firmly with a rubber layer 71 which insulates and secures the barrel of a standard tire-inflation check valve, designated 72. The inner end of the valve body 70 is threaded to secure an inner cap 73 which carries an aneroid barometer element formed by the metal stamping 74 and by the flexible metallic diaphragm 75 which is hermetically sealed to the top stamping 74 at its margins. A perforated metal contact disk 76 is assembled with the barometer element by a rolled-over lip 77 on the top of the cap 73. The diaphragm 75 has in its center a contact pin 78 which is adapted to form electrical contact with deformable tongue 79 in the center of the disk 76. Before assembling the inner cap 73 on the valve body it is calibrated, as described in my prior application No. 585,223, by deforming the tongue 79 so that it is contacted by the pin 78 when the absolute pressure of the calibrating chamber, in which the barometer element is pre-set, falls to a level of, for example 30 lbs. in.$^2$ absolute. As previously stated this may be most conveniently effected by first assembling the aneroid element itself under a pressure of about 35 lbs. per in.$^2$ absolute, so that the flexible diaphragm 76 will be bowed outward by a substantial amount when the pressure on it drops to about 30 lbs. per in.$^2$ absolute. To insure electrical contact between the insulated metal disk 76 and the insulated metal barrel 72 of the valve, there may be used as before a light spring metal spider 80 which is mounted in the top of the barrel 72 before the cap 73 is screwed on. The valve body 70 is necessarily perforated as shown at 81, to permit free passage of air into and out of the tire chamber surrounding the valve. The necessary electrical connection to the deflation alarm circuit of the vehicle is provided, as before described, by a metal band 50 carrying the live wire 24. A standard outer valve cap 82 may be used on the standard inflation check valve barrel 72.

The valve construction shown in FIGURE 6 is suitable for use in any form of tubeless pneumatic tires, and by mounting the valve in the tube it can also be used in any standard tire equipped with an inner tube, provided only that metallic contact between the valve body and the tire rim is effected. Since the difference between normal tire inflation pressure and the lower pressure at which it is important to sound a deflation alarm is quite substantial, for example 5 lbs. per in.$^2$, the aneroid barometer element carried on the inner end of the inflation valves does not need to be delicate or extremely accurate. It does not alter or affect the construction or operation of the standard tire inflation check valve and its barrel and outer cap.

While I have shown and described in some detail various embodiments of my invention, it will be understood that this is only for the purpose of making the essentials of the invention more clear and I do not regard it as limited to particular details shown or described save insofar as they may be defined by the appended claims, in which it is my intention to claim all novelty inherent in the invention as far as is permissible in view of the prior art.

What I claim is:

1. A combined inflation valve and circuit-closing mechanism for pneumatic tires comprising an elongated valve body carrying means intermediate its length for mounting it in the valve opening of a metallic rim to form electrical contact therewith, and with one portion of the valve body extending through the rim opening so as to be located in the air chamber of a tire mounted on the rim and the other portion extending outward from the rim and terminating in a portion adapted for detachable connection with an air inflation conduit, controllable means within the valve body for interrupting or permitting passage of air therethrough, a movable contact element responsive in its motion to air pressure around it carried by the inner portion of the valve body so as to lie within a tire mounted on the rim, a stationary contact element also carried by the said inner portion so as to lie within the tire and in operative relation to said movable element, and means for completing an external electrical circuit to the rim through the outwardly extending portion of the valve body and through the said contact elements.

2. A combination in accordance with claim 1 in which the valve body itself forms one conductor to establish electrical connection between the external circuit and the said contacts, and carries an insulated central barrel forming the outwardly extending portion and containing the means for interrupting or permitting flow of air through the valve and which also forms the second conductor for completing the connection between the external electrical circuit and the said internal contact elements.

3. A combination as described in claim 1 in which the movable element responsive to air pressure around it is a flexible disk rigidly secured around its margin and free to bellow in its central portion under the influence of differential air pressures on its opposite faces.

4. A combination as described in claim 1 in which the movable element responsive to air pressure is the flexible face disk of an aneroid barometer, the sealed air chamber housing of which is a rigid element attached to the valve body.

5. A combination as described in claim 1 in which the controllable means within the valve body for interrupting or permitting passage of air therethrough may be selectively controlled to deliver or release air either to the tire chamber surrounding the inner portion of the valve or to a second remote tire chamber, and the inner portion of the valve body provides channels for exposing one face of the disk to the pressure of the tire chamber which surrounds it and the other face to the pressure of the remote tire chamber.

6. A pneumatic tire inflation valve comprising a metallic body portion carrying means intermediate its ends for securing it in and grounding it to a metallic tire rim, a metallic valve barrel carried by and extending through the valve body but insulated electrically therefrom, a movable element responsive to air pressure carried by the inner end of the valve, and a pair of electrical contact members in operative relation thereto, one of said members being connected to the valve body and the other to the insulated valve barrel which passes therethrough.

7. A combined air inflation valve for pneumatic tires and deflation alarm circuit-closing mechanism comprising an annular metallic body section provided with means for mounting in an opening in an air retaining wall, a metallic valve barrel adapted to receive the movable valve parts carried centrally in the annular section but electrically insulated therefrom and extending outwardly from the rim to provide for detachable connection to an external air conduit, and a metallic aneroid barometer element carried by the inner end of the annular section in electrical connection therewith and with its flexible face opposed to the end of the valve barrel, said flexible face being exposed to the atmosphere enveloping the inner end of the annulus, whereby reduction in pressure of such atmosphere causes the flexible face of the aneroid element to be distended and approach the end of the insulated valve barrel for establishing electrical contact therewith.

8. A construction in accordance with claim 7 in which the aneroid element is assembled as a separate detachable unit with a spaced stationary insulated deformable metallic member interposed between the opposed end of the valve barrel and the flexible face and in electrical contact with the valve barrel, whereby the detachable unit may be calibrated separately by deformation of the deformable member before attachment to the annulus.

References Cited by the Examiner

UNITED STATES PATENTS

| 1,924,921 | 8/33 | Frank | 200—61.25 |
| 2,447,777 | 8/48 | Slovack | 200—61.25 |
| 2,554,594 | 5/51 | Shea | 340—58 |
| 2,649,518 | 8/53 | Fuehring | 200—61.26 |
| 2,868,908 | 1/59 | Robinson | 200—61.25 |
| 2,969,824 | 1/61 | Howard | 152—340 |

BERNARD A. GILHEANY, *Primary Examiner.*

MAX L. LEVY, ROBERT K. SCHAEFER, *Examiners.*